United States Patent
Chen et al.

(10) Patent No.: US 10,642,107 B2
(45) Date of Patent: May 5, 2020

(54) DISPLAY SUBSTRATE, METHOD OF MANUFACTURING THE SAME AND DISPLAY DEVICE

(71) Applicants: BOE TECHNOLOGY GROUP CO., LTD., Beijing (CN); FUZHOU BOE OPTOELECTRONICS TECHNOLOGY CO., LTD., Fuqing, Fuzhou, Fujian (CN)

(72) Inventors: Tingwei Chen, Beijing (CN); Weihong Jiao, Beijing (CN); Qian Zhang, Beijing (CN); Yangqing Wang, Beijing (CN); Duo Zhang, Beijing (CN)

(73) Assignees: BOE TECHNOLOGY GROUP CO., LTD., Beijing (CN); FUZHOU BOE OPTOELECTRONICS TECHNOLOGY CO., LTD., Fuzhou (CN)

( * ) Notice: Subject to any disclaimer, the term of this patent is extended or adjusted under 35 U.S.C. 154(b) by 10 days.

(21) Appl. No.: 16/108,718

(22) Filed: Aug. 22, 2018

(65) Prior Publication Data
US 2019/0293984 A1    Sep. 26, 2019

(30) Foreign Application Priority Data
Mar. 23, 2018    (CN) .......................... 2018 1 0246673

(51) Int. Cl.
*G02F 1/1339*    (2006.01)
*G02F 1/1335*    (2006.01)
*G02F 1/1337*    (2006.01)

(52) U.S. Cl.
CPC ........ *G02F 1/13394* (2013.01); *G02F 1/1337* (2013.01); *G02F 1/133514* (2013.01)

(58) Field of Classification Search
CPC ............... G02F 1/13394; G02F 1/1337; G02F 1/133514
USPC .......................................................... 349/155
See application file for complete search history.

(56) References Cited

U.S. PATENT DOCUMENTS

2016/0252767 A1* 9/2016 Lv .................... G02F 1/133512
257/59

FOREIGN PATENT DOCUMENTS

KR    20130025219 A    *  3/2013

* cited by examiner

*Primary Examiner* — Nathanael R Briggs
*Assistant Examiner* — William D Peterson
(74) *Attorney, Agent, or Firm* — Kinney & Lange, P.A.

(57) ABSTRACT

A display substrate, a method of manufacturing a display substrate and a display device are provided. The display substrate includes a display area and a non-display area. The display substrate includes a base substrate, and a spacer wall on the base substrate and in the non-display area. The spacer wall includes a plurality of first spacers. The spacer wall extends in a first direction, each of the plurality of first spacers extends in a second direction, and the first direction intersects the second direction.

18 Claims, 5 Drawing Sheets

DISPLAY SUBSTRATE, METHOD OF MANUFACTURING THE SAME AND DISPLAY DEVICE

CROSS-REFERENCE TO RELATED APPLICATION

This application claims the benefit of Chinese Patent Application No. 201810246673.3 filed on Mar. 23, 2018 in the State Intellectual Property Office of China, the whole disclosure of which is incorporated herein by reference.

BACKGROUND

The present disclosure relates to the field of display technologies, and in particular to a display substrate, a method of manufacturing the display substrate, and a display device.

During manufacturing liquid crystal display, it is an indispensable process to align liquid crystal molecules in a certain direction, and a rubbing process is one of the processes to align liquid crystal molecules in the certain direction. In the rubbing process, a rubbing cloth (nylon, fiber, cotton, etc.) is used to rub an alignment film in the certain direction so that a surface condition of the alignment film is changed regularly. In this way, the alignment film has an ability to align the liquid crystal molecules so that the liquid crystal molecules may be arranged at a desired pre-tilt angle.

SUMMARY

In an aspect, it is provided a display substrate including a display area and a non-display area, the display substrate may include: a base substrate; and a spacer wall on the base substrate and in the non-display area, the spacer wall including a plurality of first spacers, wherein the spacer wall extends in a first direction, each of the plurality of first spacers extends in a second direction, and the first direction intersects the second direction.

Optionally, the display substrate further includes a particle collecting structure between the spacer wall and the display area.

Optionally, the particle collecting structure includes a plurality of protrusions in an array and/or a plurality of grooves in an array.

Optionally, the plurality of protrusions have different heights, or the plurality of protrusions include a first group of protrusions and a second group of protrusions, a height of each protrusion of the first group of protrusions being different from a height of each protrusion of the second group of protrusions.

Alternatively or additionally, the plurality of grooves have different depths, or the plurality of grooves include a first group of grooves and a second group of grooves, and a depth of each groove of the first group of grooves being different from a depth of each groove of the second group of grooves.

Optionally, a shape of a projection of each of the plurality of protrusions on the base substrate is one or more of a square shape, a circular shape, an elliptical shape, a triangular shape, a water-drop shape or an irregular shape.

Alternatively or additionally, a shape of a projection of each of the plurality of grooves on the base substrate is one or more of a square shape, a circular shape, an elliptical shape, a triangular shape, a water-drop shape or an irregular shape.

For example, the display substrate is a color filter substrate.

Optionally, the color filter substrate includes a second spacer in the display area, and a shape of a projection of the second spacer on the base substrate is a water-drop shape.

Optionally, the color filter substrate further includes a third spacer in the display area, the second spacer functions as a main support, the third spacer functions as a secondary support, and a shape of a projection of the third spacer on the base substrate is a water-drop shape.

Optionally, a height of the second spacer in a direction perpendicular to the base substrate is greater than a height of the third spacer in the direction perpendicular to the base substrate.

Optionally, the water-drop shape has an axis of symmetry in its length direction, a width of the water-drop shape at a first end in the length direction is greater than a width of the water-drop shape at a second end in the length direction, and both the first end and the second end are rounded.

Optionally, the length direction is consistent with the second direction.

Optionally, the color filter substrate includes a group of third spacers including two third spacers side by side, and the first ends of the group of third spacers in the water-drop shape face towards the same direction.

Optionally, an area of a cross section of each of the second spacer and the third spacer is gradually reduced in a direction away from the base substrate, and a top of each of the second spacer and the third spacer is arcuate.

Optionally, the particle collecting structure is disposed in a dummy pixel area, the particle collecting structure includes a plurality of grooves in an array, and the plurality of grooves are spaced apart from each other in both the first direction and the second direction.

In another aspect, it is provided a method of manufacturing a display substrate, including: providing a base substrate; and forming a spacer wall on the base substrate and in a non-display area of the display substrate, wherein the spacer wall includes a plurality of first spacers, the spacer wall extends in a first direction, each of the plurality of first spacers extends in a second direction, and the first direction intersects the second direction.

Optionally, the display substrate is a color filter substrate, and the method further includes: forming a particle collecting structure in a dummy pixel area of the color filter substrate.

Optionally, forming a particle collecting structure in the dummy pixel area of the color filter substrate includes: forming red dummy pixels in the dummy pixel area, a first groove being formed between adjacent red dummy pixels of one column of red dummy pixels; forming green dummy pixels in the dummy pixel area, a second groove being formed between adjacent green dummy pixels of one column of green dummy pixels; forming blue dummy pixels in the dummy pixel area, a third groove being formed between adjacent blue dummy pixels of one column of blue dummy pixels; and forming an overcoat layer on the red dummy pixels, the green dummy pixels and the blue dummy pixels to form the particle collecting structure.

Optionally, the method further includes: forming a second spacer and a third spacer in a display area of the display substrate, wherein a shape of a projection of each of the second spacer and the third spacer on the base substrate is a water-drop shape.

Optionally, the plurality of first spacers, the second spacer and the third spacer are formed in the same layer.

In a further aspect, it is provided a display device including the display substrate as stated above.

DETAILED DESCRIPTION

In order to make objects, technical solutions and advantages of the present disclosure more clear, the present disclosure will be further described in detail below in conjunction with specific embodiments with reference to accompanying drawings.

It should be noted that all expressions using "first" and "second" in the embodiments of the present disclosure are used to distinguish two different entities with the same name or two different parameters with the same name, and "first" and "second" are for the convenience of the description, they should not be construed as limiting the embodiments of the present disclosure, and the following embodiments will not be explain these expressions again.

A method of manufacturing a liquid crystal display includes a step of forming an alignment layer through a rubbing process. During the rubbing process, PI (i.e. polyimide) debris or rubbing cloth debris is easily generated, and it is difficult to remove the debris completely during a cleaning process, resulting in scattered bright spots, that is, Zara phenomenon. With regard to this undesirable microscopic phenomenon, the Inventors found that the debris is mainly accumulated at a side of the display panel, especially in a rubbing shadow area.

Figure 1:
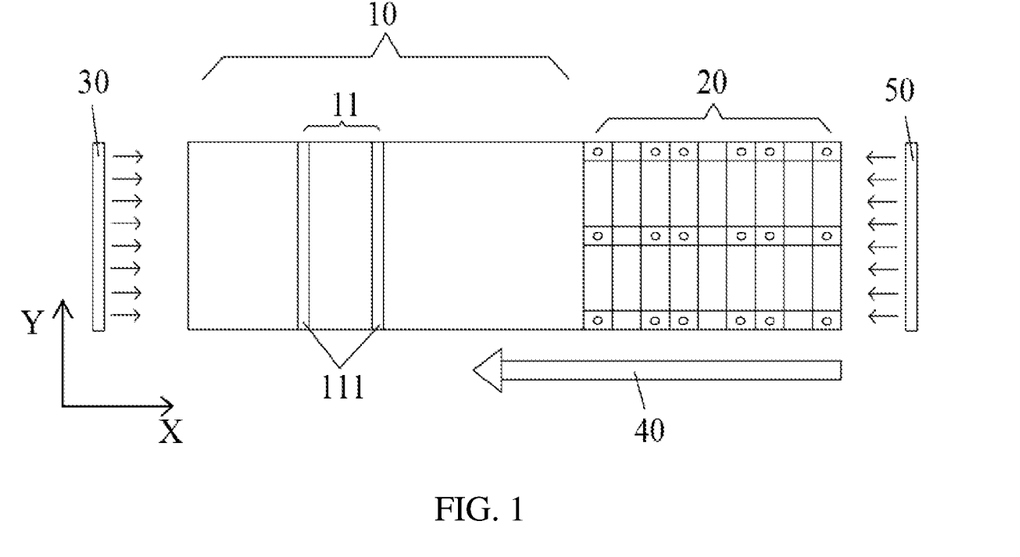
FIG. 1 is a schematic structural view of a display substrate.

Specifically, as shown in FIG. 1, a schematic structural view of a display substrate is shown. The display substrate includes a display area 20 and a non-display area 10. In the non-display area 10, a spacer (e.g. post spacer) wall 11 is provided. The spacer wall 11 includes two spacers 111, and the two spacers 111 extend in a direction parallel to a direction in which the overall spacer wall 11 extends. As shown in FIG. 1, the overall spacer wall 11 extends in Y direction, and the two spacers 111 also extend in Y direction.

In the spacer wall 11 of the display substrate shown in FIG. 1, the debris may be accumulated at the spacers 111 during the rubbing process due to the two spacers 111. As shown in FIG. 1, a glass substrate on which a color filter process has been performed, abbreviated as CF glass, moves from left to right under the control of a control device. After a rubbing treatment process by a rubbing roller 50, the CF glass may move from right to left under the control of the control device to be cleaned, that is, a movement direction 40 of the CF glass in an after-rubbing cleaner (abbreviated as ARC) is from right to left. Then, the CF glass may be dried by ARC air knife (abbreviated as ARC AK) 30 which serves to dry the CF glass after it is subjected to water cleaning. As the movement direction 40 of the CF glass in the after-rubbing cleaner is from right to left, it is difficult to remove the debris at a shadow side (right side shown in FIG. 1) of both the spacer wall 11 and the two spacers 111 as the CF glass is cleaned in the after-rubbing cleaner, resulting in scattered bright spots, that is, Zara phenomenon.

Figure 2:
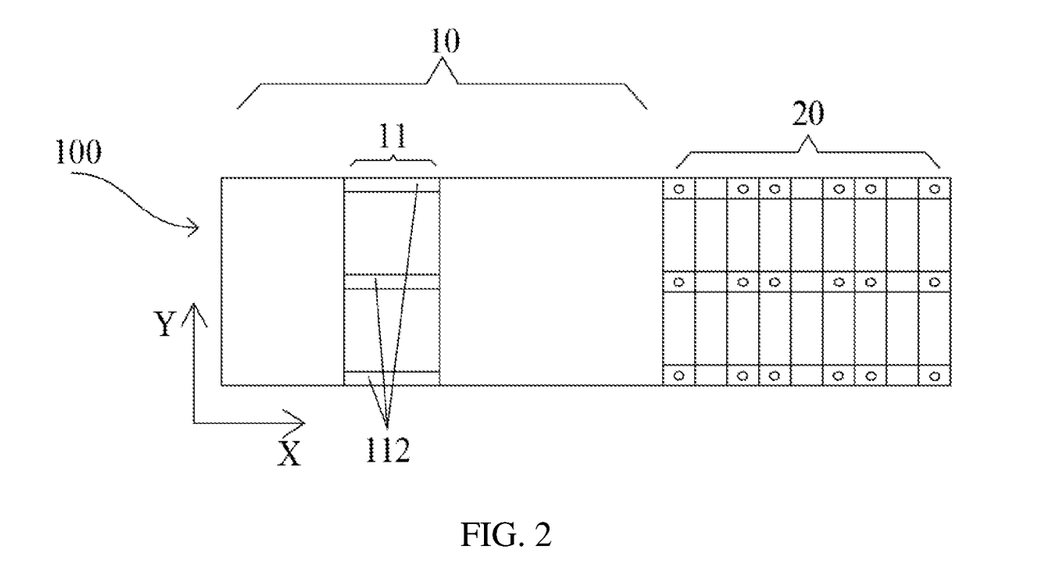
FIG. 2 is a schematic plan view of a display substrate according to an embodiment of the present disclosure.

In order to solve at least the above problem, in a first aspect of embodiments of the present disclosure, an embodiment provides a display substrate, which may prevent a situation that the debris is difficult to be removed to a certain extent. FIG. 2 is a schematic plan view of a display substrate according to an embodiment of the present disclosure.

As shown in FIG. 2, the display substrate includes a display area 20 and a non-display area 10. The display substrate may include a base substrate 100, a spacer (e.g. post spacer) wall 11 disposed on the base substrate 100 and located in the non-display area 10. The spacer wall 11 may include a plurality of first spacers 112. The spacer wall 11 may extend in a first direction, and each of the plurality of first spacers 112 may extend in a second direction. In an example, the first direction may be perpendicular to the second direction. Referring to FIG. 2, an extending direction (i.e. the first direction) of the spacer wall 11 is Y direction (based on FIG. 2), and an extending direction (i.e. the second direction) of the plurality of first spacers 112 is X direction. In such a case, regardless of whether a cleaning direction is from left to right or from right to left (based on FIG. 2), a debris accumulation may be greatly reduced as a width of a shadow side (right side or left side based on FIG. 2) of the first spacers 112 is small. It should be noted that the cleaning direction here refers to a direction from right to left if the display substrate moves from left to right during cleaning and a direction from left to right if the display substrate moves from right to left during cleaning. Further, it should be noted that, if the extending direction (i.e. the first direction) of the spacer wall 11 is X direction, the extending direction (i.e. the second direction) of the first spacers 112 should be Y direction in order to ensure that the extending direction of each of the first spacers 112 is perpendicular to the extending direction of the spacer wall 11.

It can be seen from the above embodiments that the extending direction of the first spacers of the spacer wall is set to be perpendicular to the extending direction of the spacer wall in the display substrate provided by the embodiment of the present disclosure, so that the spacer wall not only serves to support a cell gap, but also reduces the debris accumulation at a side of the spacers.

Figure 3:
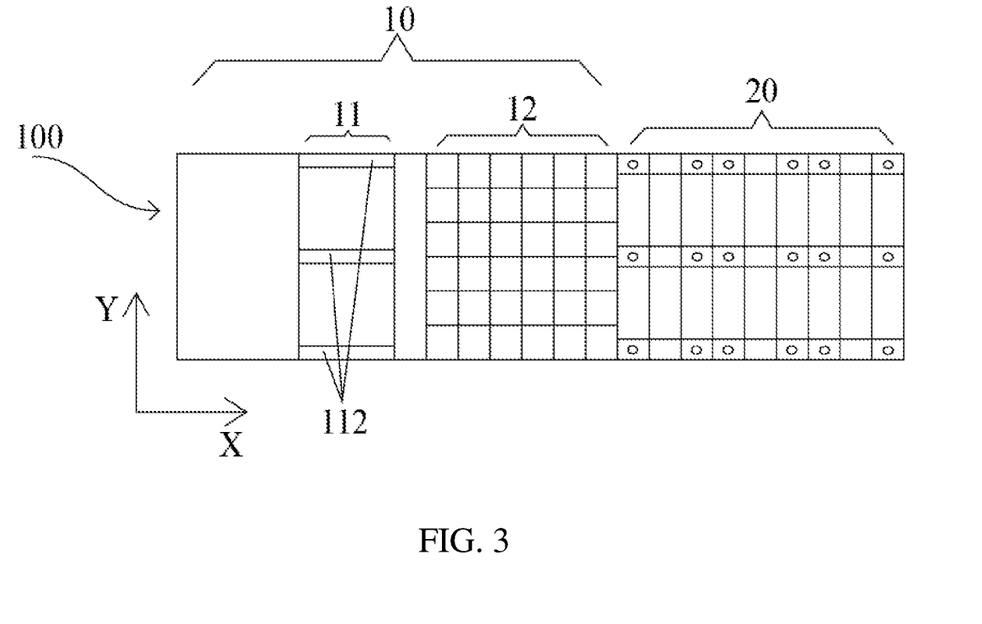
FIG. 3 is a schematic plan view of a display substrate according to another embodiment of the present disclosure.

An embodiment of the present disclosure also provides another display substrate, which may prevent a situation that the debris is difficult to be removed to a certain extent. FIG. 3 is a schematic plan view of a display substrate according to another embodiment of the present disclosure.

As shown in FIG. 3, the display substrate includes a display area 20 and a non-display area 10. The display substrate may include a base substrate 100, a spacer wall 11 disposed on the base substrate 100 and located in the non-display area 10. The spacer wall 11 may include a plurality of first spacers 112. The spacer wall 11 may extend in a first direction, and the plurality of first spacers 112 may extend in a second direction. In an example, the first direction may be perpendicular to the second direction. Referring to FIG. 3, an extending direction (i.e. the first direction) of the spacer wall 11 is Y direction (based on FIG. 3), and an extending direction (i.e. the second direction) of the plurality of first spacers 112 is X direction. In such a case, regardless of whether a cleaning direction is from left to right or from right to left (based on FIG. 3), a debris accumulation may be greatly reduced as a width of a shadow side (right side or left side based on FIG. 3) of the first spacers 112 is small. It should be noted that the cleaning direction here refers to a direction from right to left if the display substrate moves from left to right during cleaning and a direction from left to right if the display substrate moves from right to left during cleaning. Further, it should be noted that, if the extending direction (i.e. the first direction) of the spacer wall 11 is X direction, the extending direction (i.e. the second direction) of the first spacers 112 should be Y direction in order to ensure that the extending direction of the first spacers 112 is perpendicular to the extending direction of the spacer wall 11.

The display substrate may further include a particle collecting structure 12 disposed between the spacer wall 11 and the display area 20. By means of disposing the particle collecting structure 12, it may block particles such as debris, to prevent the particles from entering the display area 20, which may otherwise cause the Zara phenomenon.

It can be seen from the above embodiment that the extending direction of the first spacers of the spacer wall is set to be perpendicular to the extending direction of the spacer wall in the display substrate provided by the embodiment of the present disclosure, so that the spacer wall not only serves to support a cell gap, but also reduces the debris accumulation at a side of the spacers. Moreover, by means of disposing the particle collecting structure between the spacer wall and the display area, it may block the particles such as debris, to prevent the particles from entering the display area 20, which may otherwise cause the Zara phenomenon.

Figure 4A:
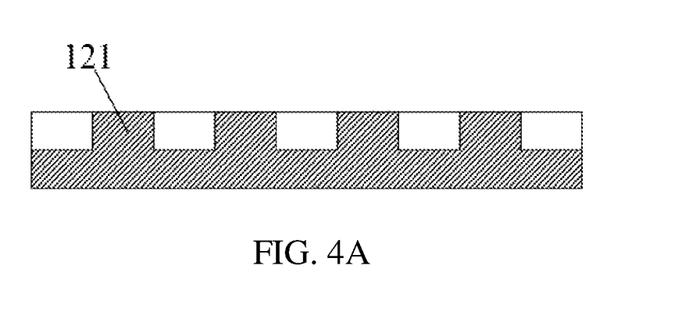
FIG. 4A is a cross-sectional view of a particle collecting structure of a display substrate according to an embodiment of the present disclosure.
Figure 4B:
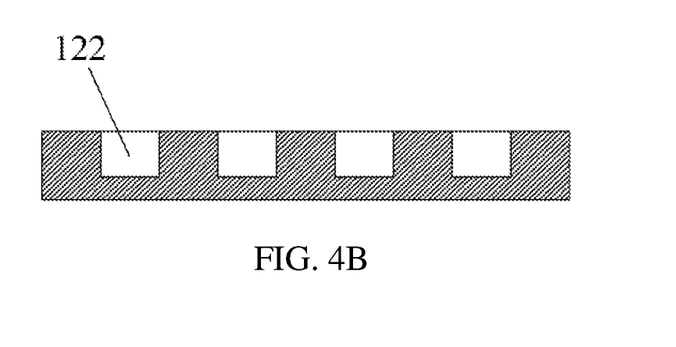
FIG. 4B is a cross-sectional view of a particle collecting structure of a display substrate according to an embodiment of the present disclosure.
Figure 4C:
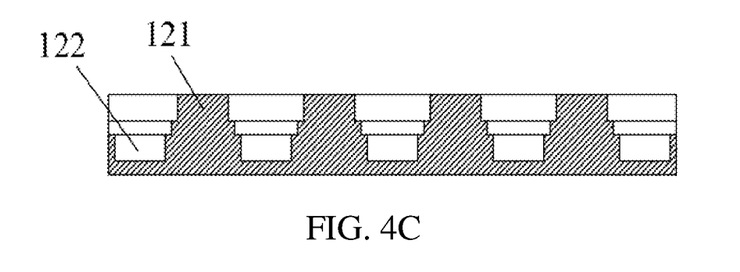
FIG. 4C is a cross-sectional view of a particle collecting structure of a display substrate according to an embodiment of the present disclosure.

Optionally, referring to FIG. 4A, the particle collecting structure 12 includes a plurality of protrusions 121 in an array. Alternatively, referring to FIG. 4B, the particle collecting structure 12 includes a plurality of grooves 122 in an array. Alternatively, referring to FIG. 4C, the particle collecting structure 12 includes a plurality of protrusions 121 in an array and a plurality of grooves 122 in an array. In this way, the particle collecting structure 12 is formed into an uneven structure so that it may collect the particles such as debris more easily during ARC cleaning to prevent the particles from entering the display area 20. It should be noted that the plurality of protrusions and/or the plurality of grooves may not be arranged in regular rows and columns, that is, they may be arranged in a staggered arrangement, for example, two adjacent rows of protrusions may be arranged in a staggered arrangement, as shown in FIG. 4A, an upper horizontal line between two adjacent protrusions may indicate the staggered arrangement of the protrusions. Of course, it can be known that the plurality of protrusions and/or the plurality of grooves may be arranged in regular rows and columns, for example, two adjacent rows of protrusions may be arranged in parallel, which also belongs to one of the embodiments of the present disclosure, and cannot be excluded outside the scope of protection of the present disclosure. Similarly, two adjacent rows of the array of grooves 122 may also be arranged in parallel or in the staggered arrangement. Of course, it can also be analogized to cases where the grooves and the protrusions may coexist, and these cases will not be described again here.

Figure 4D:
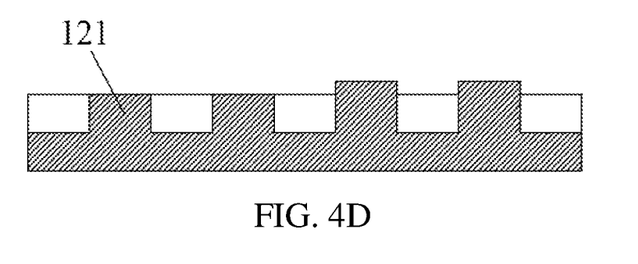
FIG. 4D is a cross-sectional view of a particle collecting structure of a display substrate according to an embodiment of the present disclosure.

Optionally, a height of a group of protrusions may be different from a height of another group of protrusions. Referring to FIG. 4D, a height of each of two protrusions on the left side is smaller than a height of each of two protrusions on the right side. Here, the two protrusions on the left side may be considered as a group of protrusions while the two protrusions on the right side may be considered as another group of protrusions. Limited by the length of the specification, only two groups of protrusions are described and shown here. It can be known that there may be multiple groups of protrusions, and each of the multiple groups may have a different height from the other groups. Of course, it can also be understood that the protrusions having the same height are grouped together, and any one group has a different height from the other groups. Optionally, the height of each of the protrusions 121 may be different from the other protrusions 112, that is, each protrusion has a different height from the other protrusions. Optionally, a shape of a projection of the protrusion 121 on the base substrate may be one or more of a square shape, a circular shape, an elliptical shape, a triangular shape, a water-drop shape, or an irregular shape.

Figure 4E:
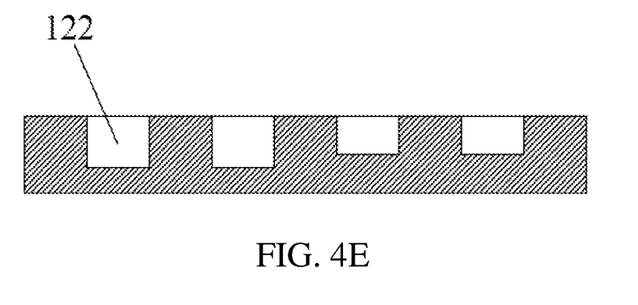
FIG. 4E is a cross-sectional view of a particle collecting structure of a display substrate according to an embodiment of the present disclosure.

Optionally, referring to FIG. 4E, a depth of a group of grooves 122 may be different from a depth of another group of grooves 122, which may refer to the description of the protrusions, and details are not described herein again. Optionally, the depth of each of the grooves 122 may be different from the other grooves 122, that is, each groove has a different depth from the other grooves 122. Optionally, a shape of a projection of the groove 122 on the display substrate may be one or more of a square shape, a circular shape, an elliptical shape, a triangular shape, a water-drop shape, or an irregular shape.

Figure 6A:
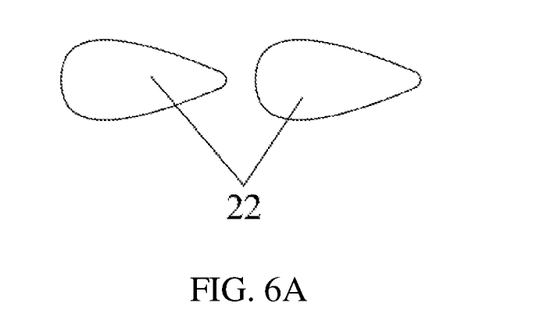
FIG. 6A is a schematic diagram of a projection of a second spacer of a display substrate on the base substrate according to an embodiment of the present disclosure.
Figure 6B:
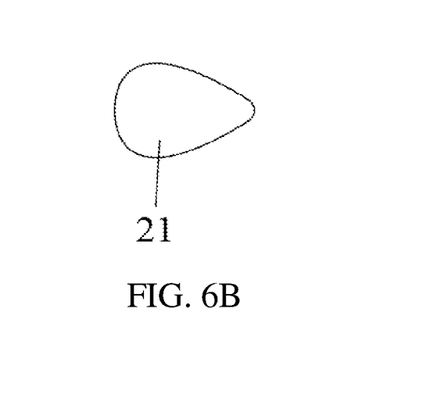
FIG. 6B is a schematic diagram of a projection of a third spacer of a display substrate on the base substrate according to an embodiment of the present disclosure.

Optionally, referring to FIG. 6A or FIG. 6B, the water-drop shape has an axis of symmetry in its length direction, and a width of the water-drop shape at a first end in the length direction is greater than a width of the water-drop shape at second end in the length direction, and both the first end and the second end are rounded.

It should be noted that the display substrate in the foregoing embodiments of display substrate may be an array substrate or a color filter substrate, and the protection scope of the present disclosure is not limited to one type of display substrate, and it should be understood that any of the foregoing embodiments may be applied to any type of display substrate.

Figure 5:
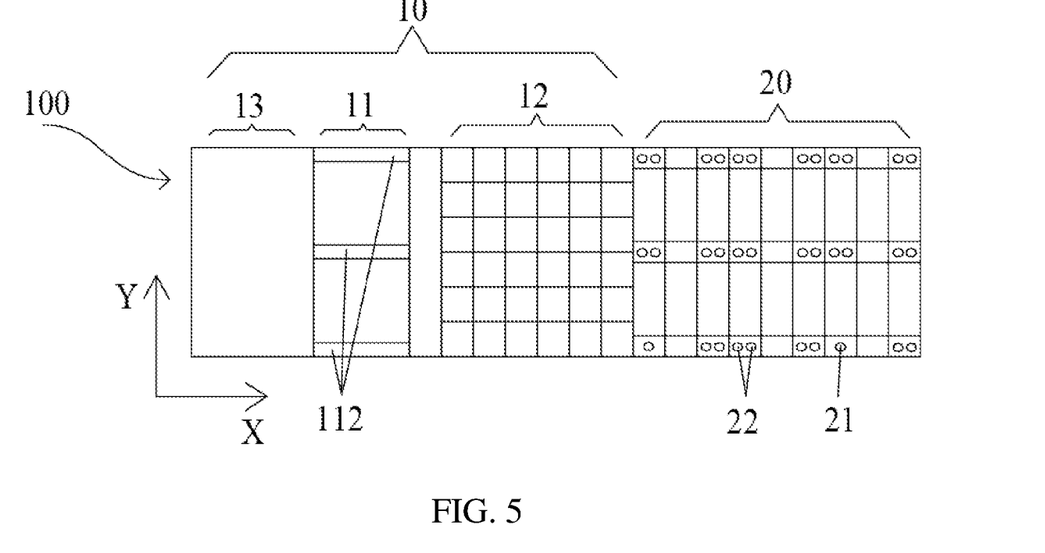
FIG. 5 is a schematic plan view of a display substrate according to another embodiment of the present disclosure.

An embodiment of the present disclosure also provides another display substrate, which may prevent a situation that the debris is difficult to be removed to a certain extent. FIG.

5 is a schematic plan view of a display substrate according to another embodiment of the present disclosure.

As shown in FIG. 5, the display substrate is a color filter substrate, and includes a display area 20 and a non-display area 10. The display substrate may include a base substrate 100, a spacer wall 11 disposed on the base substrate 100 and located in the non-display area 10. The spacer wall 11 may include a plurality of first spacers 112. The spacer wall 11 may extend in a first direction, and the plurality of first spacers 112 may extend in a second direction. In an example, the first direction may be perpendicular to the second direction. Referring to FIG. 5, an extending direction (i.e. the first direction) of the spacer wall 11 is Y direction (based on FIG. 5), and an extending direction (i.e. the second direction) of the plurality of first spacers 112 is X direction. In such a case, regardless of whether a cleaning direction is from left to right or from right to left (based on FIG. 5), a debris accumulation may be greatly reduced as a width of a shadow side (right side or left side based on FIG. 5) of the first spacers 112 is small. It should be noted that the cleaning direction here refers to a direction from right to left if the display substrate moves from left to right during cleaning and a direction from left to right if the display substrate moves from right to left during cleaning. Further, it should be noted that, if the extending direction (i.e. the first direction) of the spacer wall 11 is X direction, the extending direction (i.e. the second direction) of the first spacers 112 should be Y direction in order to ensure that the extending direction of the first spacers 112 is perpendicular to the extending direction of the spacer wall 11.

The display substrate may further include a particle collecting structure 12 disposed between the spacer wall 11 and the display area 20. By means of disposing the particle collecting structure 12, it may block the particles such as debris, to prevent the particles from entering the display area 20, which may otherwise cause the Zara phenomenon.

The color filter substrate may include a second spacer 21 disposed in the display area 20. A shape of a projection of the second spacer 21 on the base substrate is a water-drop shape (refer to FIG. 6B). The shape of the projection of the second spacer 21 on the base substrate is set to be the water-drop shape so that the particles (e.g. debris) adsorbed on the second spacer 21 may be more easily removed and is less likely to accumulate on the second spacer 21.

Optionally, the color filter substrate may further include a third spacer 22 disposed in the display area 20. The second spacer 21 functions as a main support, and the third spacer 22 functions as a secondary support. A shape of a projection of the third spacer 22 on the base substrate is also a water-drop shape. By providing the second spacer 21 functioning as the main support and the third spacer 22 functioning as the secondary support, the second spacer 21 and the third spacer 22 may support the display area better. Meanwhile, the shapes of the projections of both the second spacer and the third spacer on the base substrate are water-drop shape, so that the particles (e.g. debris) may be more easily removed. Optionally, a height of the second spacer 21 in a direction perpendicular to the base substrate 100 is greater than a height of the third spacer 22 in the direction perpendicular to the base substrate 100, so that a better support may be obtained.

Optionally, referring to FIG. 6A or FIG. 6B, the water-drop shape has an axis of symmetry in its length direction, and a width of the water-drop shape at a first end in the length direction is greater than a width of the water-drop shape at second end in the length direction, and both the first end and the second end are rounded.

Optionally, the length directions of both the second spacer 21 and the third spacer 22 are consistent with the second direction, as shown, the length directions of both the second water-drop spacer 21 and the third water-drop spacer 22 are X direction. Optionally, the color filter substrate is further provided with an alignment film. The alignment film is cleaned by a cleaning device (optionally, ARC) after it has been rubbed. Narrower ends of both the second water-drop spacer 21 and the third water-drop spacer 22 face towards a cleaning direction of the cleaning device. Thus, the narrower second ends of both the second spacer 21 and the third spacer 22 may face towards right if the cleaning direction is from left to right; alternatively, the narrower second ends of both the second spacer 21 and the third spacer 22 may face towards left if the cleaning direction is from right to left. In this way, the particles (e.g. debris) located at the shadow sides (which is the right side if the cleaning direction is from left to right, or which is the left side if the cleaning direction is from right to left) of both the second spacer 21 and the third spacer 22 may be easily removed and not easily accumulated. It should be noted that the cleaning direction herein means that the cleaning direction is from right to left if the color filter substrate moves from left to right during cleaning, in this case, the second ends of both the second water-drop spacer 21 and the third water-drop spacer 22 face left, and vice versa.

Optionally, as shown in FIG. 6A, two third spacers 22 arranged side by side belong to a group, and the first ends of the third water-drop shape spacers 22 in the group face towards the same direction. Thus, narrower ends of the third water-drop shape spacers 22 in the group face towards the same direction so that the particles located between the third spacers 22 of the group of the third spacers 22 can be more easily removed and the particles are not easily accumulated there.

Figure 6C:
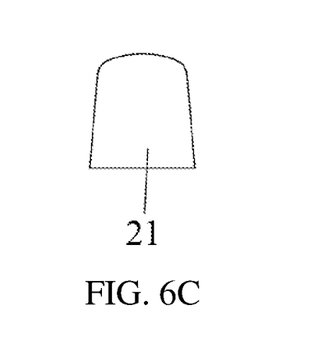
FIG. 6C is a schematic diagram of a projection of a second spacer of a display substrate on a plane perpendicular to the base substrate according to an embodiment of the present disclosure.

Optionally, referring to FIG. 6C, an area of a cross section of each of the second spacer 21 and the third spacer 22 is gradually reduced in a direction away from the base substrate 100, and a top of each of the second spacer 21 and the third spacer 22 in the direction away from the base substrate 100 is arcuate.

It can be seen from the above embodiment that the extending direction of the first spacers of the spacer wall is set to be perpendicular to the extending direction of the spacer wall in the display substrate provided by the embodiment of the present disclosure, so that the spacer wall not only serves to support a cell gap, but also reduces the debris accumulation at a side of the spacers. Moreover, by means of disposing the particle collecting structure between the spacer wall and the display area, it may block the particles such as debris, to prevent the particles from entering the display area 20, which may otherwise cause the Zara phenomenon. Further, the shape of the projection of the second spacer on the display substrate is set to be the water-drop shape so that the particles (e.g. debris) may be more easily removed.

Figure 7:
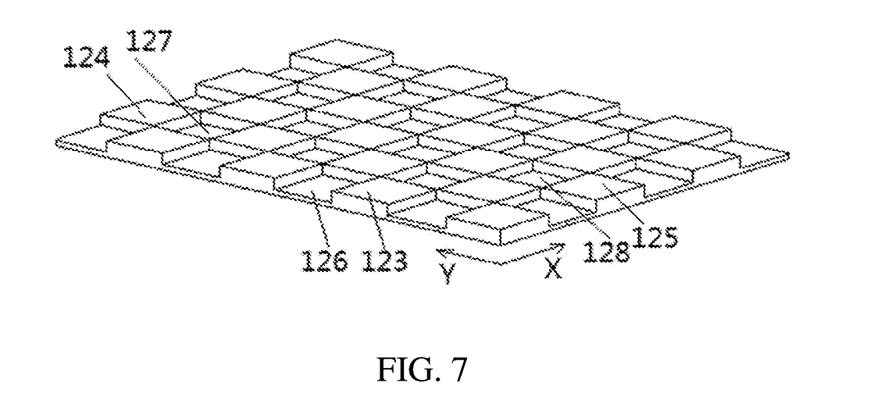
FIG. 7 is a schematic perspective view of a particle collecting structure of a display substrate according to an embodiment of the present disclosure.

In some optional embodiments, referring to FIG. 5, the particle collecting structure 12 is disposed in a dummy pixel area. As shown in FIG. 7, the particle collecting structure 12 includes a plurality of grooves in an array. The grooves are spaced apart in both the first direction (X direction) and the second direction (Y direction). In this way, it is possible to not only maintain an original function of preventing peripheral light leakage, but also collect the particles during ARC cleaning to prevent it from entering the display area.

Specifically, as shown in FIG. 7, the particle collecting structure 12 is disposed in the dummy pixel area, so that the particle collecting structure 12 may be manufactured in a process of manufacturing color pixels (e.g. red pixel, green pixel, blue pixel) of the color filter substrate. It is only necessary to adjust a light transmission area, which corresponds to the dummy pixel area, of a mask for the color pixels (e.g. red pixel, green pixel, blue pixel). For example, an opening of the light transmission region, which corresponds to the dummy pixel area, of the mask for the red pixels, is adjusted to be separated from an adjacent opening by a distance of one pixel. In this way, after the red pixels are manufactured by using the mask for red pixels, a first groove 126 is formed between two adjacent red dummy pixels 123 of a column of red dummy pixels in the dummy pixel area. Similarly, an opening of the light transmission region, which corresponds to the dummy pixel area, of the mask for the green pixels or the blue pixels, is adjusted to be separated from an adjacent opening by a distance of one pixel. In this way, a second groove 127 is formed between two adjacent green dummy pixels 124 of a column of green dummy pixels in the dummy pixel area, and a third groove 128 is formed between two adjacent blue dummy pixels 125 of a column of blue dummy pixels in the dummy pixel area. Meanwhile, in order to ensure the particle collecting structure 12 has an uneven surface, the opening of the light transmission region, which corresponds to the dummy pixel area, of the mask for the green pixels may be misaligned with both the opening of the light transmission region, which corresponds to the dummy pixel area, of the mask for the red pixels and the opening of the light transmission region, which corresponds to the dummy pixel area, of the mask for the blue pixels, by a distance of one pixel. In this way, the dummy pixels and the grooves in the dummy pixel area may be alternately formed, so that an uneven surface is formed. Finally, an overcoat layer (abbreviated as OC) may be formed on the red dummy pixel 123, the green dummy pixel 124, and the blue dummy pixel 125, thereby completing the manufacture of the particle collecting structure 12.

Figure 8:
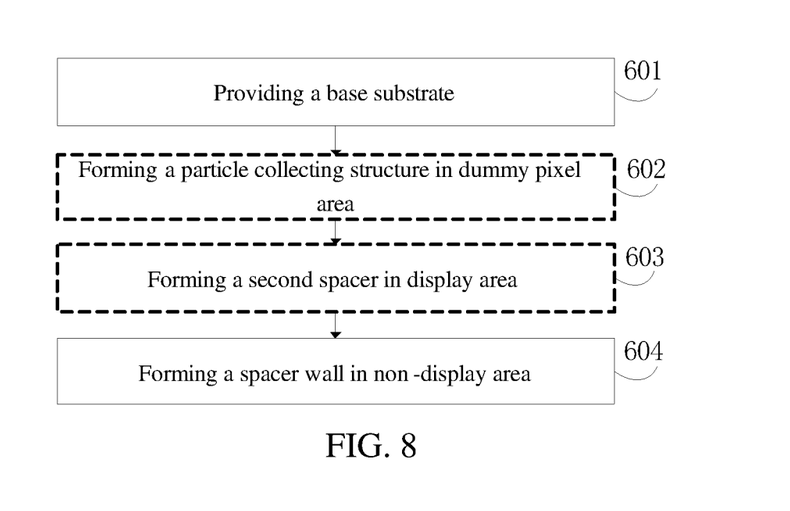
FIG. 8 is a flow chart of a method of manufacturing a display substrate according to an embodiment of the present disclosure.

In a second aspect of the embodiments of the present disclosure, an embodiment provides a method of manufacturing a display substrate, which may prevent a situation that it is difficult to remove the particles to a certain extent. FIG. 8 is a flow chart of the method of manufacturing a display substrate according to an embodiment of the present disclosure.

The method of manufacturing the display substrate may include: step 601: providing a base substrate 100; step 604: forming a spacer wall 11 in the non-display area 10 and on the base substrate 100; wherein the spacer wall 11 includes a plurality of first spacers 112, the spacer wall 11 extends in a first direction while the first spacers 112 extend in a second direction, and the first direction is perpendicular to the second direction.

It can be seen from the above embodiment that the extending direction of the first spacers of the spacer wall is set to be perpendicular to the extending direction of the spacer wall in the method of manufacturing the display substrate provided by the embodiment of the present disclosure, so that the spacer wall not only serves to support a cell gap, but also reduces the debris accumulation at a side of the spacers.

It should be noted that, in addition to the steps described in the foregoing embodiment of the method of manufacturing the display substrate, the method of manufacturing the display substrate may further include other steps for manufacturing necessary components, and details are not described herein again.

Optionally, the display substrate may be a color filter substrate, and the display substrate may include a particle collecting structure 12. As shown in FIG. 7 and FIG. 8, the method of manufacturing the display substrate may further include:

step 602: forming the particle collecting structure 12 in the dummy pixel area.

In this way, it is possible to not only maintain an original function of preventing peripheral light leakage, but also collect the particles during ARC cleaning to prevent them from entering the display area.

Further, forming the particle collecting structure in the dummy pixel area may further include: forming red dummy pixels 123 in the dummy pixel area; wherein a first groove 126 is formed between two adjacent red dummy pixels 123 of one column of red dummy pixels; forming green dummy pixels 124 in the dummy pixel area; wherein a second groove 127 is formed between two adjacent green dummy pixels 124 of one column of green dummy pixels; forming blue dummy pixels 125 in the dummy pixel area; wherein a third groove 128 is formed between two adjacent blue dummy pixels 125 of one column of blue dummy pixels; and forming an overcoat layer on the red dummy pixels 123, the green dummy pixels 124, and the blue dummy pixels 125 to complete the manufacture of the particle collecting structure 12.

In an example, centers of adjacent first groove 126, second groove 127 and third groove 128 are connected to each other to form an isosceles triangle, and a base angle of the isosceles triangle is 45°.

By employing the above steps, the particle collecting structure 12 may be manufactured while the color pixels of the color filter substrate are manufactured, thereby saving the manufacturing process and improving the production efficiency.

Optionally, the display substrate may include a second spacer and a third spacer in the display area, and the method may further include: step 603: forming a second spacer 21 and a third spacer 22 in the display area.

In an example, the shapes of the projections of both the second spacer 21 and the third spacer 22 on the display substrate are set to be the water-drop shape so that the particles (e.g. debris) may be more easily removed.

Optionally, the first spacers 112, the second spacer 21 and the third spacer 22 may be manufactured in the same layer, thereby saving process and improving efficiency.

In a third aspect of the embodiments of the present disclosure, an embodiment provides a display device, which may prevent a situation that the debris is difficult to be removed to a certain extent.

The display device may include the display substrate according to any of the embodiments as described above.

It should be noted that the display device in this embodiment may be any product or component having a display function, such as an electronic paper, a mobile phone, a tablet computer, a television, a notebook computer, a digital photo frame, a navigator, and the like.

It can be seen from the above embodiment that the extending direction of the first spacers of the spacer wall is set to be perpendicular to the extending direction of the spacer wall in the display device provided by the embodiment of the present disclosure, so that the spacer wall not only serves to support the cell gap, but also reduces the debris accumulation at a side of the spacers.

It is to be pointed out that the dimensions of layers and areas may be exaggerated in the accompanying drawings for clarity of illustration. It is also to be understood that when an element or layer is referred to as being "on" another element or layer, it may be directly on the other element or the intermediate layer may be present. In addition, it can be understood that when an element or layer is referred to as being "under" another element or layer, it may be directly under the other element or may have more than one intermediate element or layer. In addition, it can also be understood that when an element or layer is referred to as being "between" two elements or layers, it may be a single layer between the two or two elements or layers or there may be more than one intermediate element or layer. Like reference numerals indicate like elements throughout.

It should be understood by those skilled in the art that the above description is only the specific embodiment of the present disclosure, and is not intended to limit the disclosure, any modifications, equivalents, and improvements made within the spirit and principles of the present disclosure should be included in the protection scope of the present disclosure.

What is claimed is:

1. A display substrate comprising a display area and a non-display area, the display substrate comprising:
   a base substrate;
   a spacer wall on the base substrate and in the non-display area, the spacer wall comprising a plurality of first spacers; and
   a particle collecting structure between the spacer wall and the display area,
   wherein the spacer wall extends in a first direction, each of the plurality of first spacers extends in a second direction, and the first direction intersects the second direction, and
   wherein the particle collecting structure comprises a plurality of protrusions in an array and/or a plurality of grooves in an array.

2. The display substrate according to claim 1, wherein the plurality of protrusions have different heights, or the plurality of protrusions comprise a first group of protrusions and a second group of protrusions, a height of each protrusion of the first group of protrusions being different from a height of each protrusion of the second group of protrusions; and/or,
   the plurality of grooves have different depths, or the plurality of grooves comprise a first group of grooves and a second group of grooves, and a depth of each groove of the first group of grooves being different from a depth of each groove of the second group of grooves.

3. The display substrate according to claim 1, wherein a shape of a projection of each of the plurality of protrusions on the base substrate is one or more of a square shape, a circular shape, an elliptical shape, a triangular shape, a water-drop shape or an irregular shape; and/or,
   a shape of a projection of each of the plurality of grooves on the base substrate is one or more of a square shape, a circular shape, an elliptical shape, a triangular shape, a water-drop shape or an irregular shape.

4. The display substrate according to claim 1, wherein the display substrate is a color filter substrate.

5. The display substrate according to claim 4, wherein the color filter substrate comprises a second spacer in the display area, and a shape of a projection of the second spacer on the base substrate is a water-drop shape.

6. The display substrate according to claim 5, wherein the color filter substrate further comprises a third spacer in the display area, the second spacer functions as a main support, the third spacer functions as a secondary support, and a shape of a projection of the third spacer on the base substrate is a water-drop shape.

7. The display substrate according to claim 6, wherein a height of the second spacer in a direction perpendicular to the base substrate is greater than a height of the third spacer in the direction perpendicular to the base substrate.

8. The display substrate according to claim 6, wherein the water-drop shape has an axis of symmetry in its length direction, a width of the water-drop shape at a first end in the length direction is greater than a width of the water-drop shape at a second end in the length direction, and both the first end and the second end are rounded.

9. The display substrate according to claim 8, wherein the length direction is consistent with the second direction.

10. The display substrate according to claim 8, wherein the color filter substrate comprises a group of third spacers comprising two third spacers side by side, and the first ends of the group of third spacers in the water-drop shape face towards the same direction.

11. The display substrate according to claim 8, wherein an area of a cross section of each of the second spacer and the third spacer is gradually reduced in a direction away from the base substrate, and a top of each of the second spacer and the third spacer is arcuate.

12. The display substrate according to claim 4, wherein the particle collecting structure is disposed in a dummy pixel area, the particle collecting structure comprises a plurality of grooves in an array, and the plurality of grooves are spaced apart from each other in both the first direction and the second direction.

13. A method of manufacturing a display substrate, comprising:
   providing a base substrate;
   forming a spacer wall on the base substrate and in a non-display area of the display substrate; and
   forming a particle collecting structure between the spacer wall and a display area of the display substrate,
   wherein the spacer wall comprises a plurality of first spacers, the spacer wall extends in a first direction, each of the plurality of first spacers extends in a second direction, and the first direction intersects the second direction, and
   wherein the particle collecting structure comprises a plurality of protrusions in an array and/or a plurality of grooves in an array.

14. The method according to claim 13, wherein the display substrate is a color filter substrate, and forming the particle collecting structure comprises:
   forming the particle collecting structure in a dummy pixel area of the color filter substrate.

15. The method according to claim 14, wherein forming a particle collecting structure in the dummy pixel area of the color filter substrate comprises:
   forming red dummy pixels in the dummy pixel area, a first groove being formed between adjacent red dummy pixels of one column of red dummy pixels;
   forming green dummy pixels in the dummy pixel area, a second groove being formed between adjacent green dummy pixels of one column of green dummy pixels;
   forming blue dummy pixels in the dummy pixel area, a third groove being formed between adjacent blue dummy pixels of one column of blue dummy pixels; and
   forming an overcoat layer on the red dummy pixels, the green dummy pixels and the blue dummy pixels to form the particle collecting structure.

16. The method according to claim 13, further comprising:
   forming a second spacer and a third spacer in a display area of the display substrate,
   wherein a shape of a projection of each of the second spacer and the third spacer on the base substrate is a water-drop shape.

17. The method according to claim 16, wherein the plurality of first spacers, the second spacer and the third spacer are formed in the same layer.

18. A display device comprising the display substrate according to claim 1.

* * * * *